(12) United States Patent
Inaguma et al.

(10) Patent No.: US 6,452,760 B1
(45) Date of Patent: Sep. 17, 2002

(54) MAGNETORESISTIVE EFFECT MAGNETIC HEAD AND ROTARY MAGNETIC HEAD APPARATUS

(75) Inventors: Teruo Inaguma; Eiji Nakashio; Kazunori Onuma, all of Miyagi (JP)

(73) Assignee: Sony Corporation, Tokyo (JP)

( * ) Notice: Subject to any disclaimer, the term of this patent is extended or adjusted under 35 U.S.C. 154(b) by 19 days.

(21) Appl. No.: 09/689,319

(22) Filed: Oct. 12, 2000

(30) Foreign Application Priority Data

Oct. 13, 1999 (JP) .......................................... P11-291531

(51) Int. Cl.⁷ .............................. G11B 5/39; G11B 15/61
(52) U.S. Cl. ....................................... 360/319; 360/271
(58) Field of Search ................................. 360/270, 271, 360/281, 281.6, 319, 128, 129, 130.2, 130.21, 130.22, 130.23, 130.24

(56) References Cited

U.S. PATENT DOCUMENTS

| | | | | |
|---|---|---|---|---|
| 4,894,737 A | * | 1/1990 | Hamana et al. | 360/129 |
| 5,168,409 A | * | 12/1992 | Koyama et al. | 360/122 |
| 5,761,013 A | * | 6/1998 | Lee et al. | 360/123 |
| 5,831,792 A | * | 11/1998 | Ananth | 360/122 |
| 5,850,326 A | * | 12/1998 | Takano et al. | 126/113 |
| 5,969,912 A | * | 10/1999 | Cope | 360/122 |
| 5,978,176 A | * | 11/1999 | Ezaki et al. | 360/236.5 |
| 6,191,919 B1 | * | 2/2001 | Cates et al. | 360/122 |
| 6,198,600 B1 | * | 3/2001 | Kitao et al. | 360/235.2 |

* cited by examiner

Primary Examiner—David L. Ometz
(74) Attorney, Agent, or Firm—Sonnenschein, Nath & Roesnthal

(57) ABSTRACT

The width W1 of the lower shield thin film 3 and the width W2 of the upper shield thin film 7 are specified so that each of these widths is larger than the width W3 of the MR element 5 and is smaller than the contact width W4.

2 Claims, 20 Drawing Sheets

MAGNETORESISTIVE EFFECT MAGNETIC HEAD AND ROTARY MAGNETIC HEAD APPARATUS

RELATED APPLICATION DATA

The present application claims priority to Japanese Application No. P11-291531 filed Oct. 13, 1999, which application is incorporated herein by reference to the extent permitted by law.

BACKGROUND OF THE INVENTION

1. Technical Field

The present invention relates to a magnetoresistive effect magnetic head which reads signals recorded on a magnetic recording medium by using magnetoresistive effect. The present invention also relates to a rotary magnetic head apparatus using the magnetoresistive effect magnetic head.

2. Prior Art

Conventionally, the helical scan method is proposed as a reproducing/recording method. This method uses a rotary magnetic head apparatus comprising a stationary drum, a rotary drum, and a magnetic head. The rotary drum is rotatively mounted with reference to the stationary drum. The magnetic head is mounted on the rotary drum. A magnetic tape is helically wound on the peripheral surface of the rotary magnetic head apparatus. As the rotary drum rotates, the magnetic head moves and slides touchingly across the magnetic tape for recording or reproducing signals on the magnetic tape.

According to the helical scan method, the magnetic head slides in contact with the running magnetic tape at a high speed for recording and reproducing signals. This provides a fast relative slide speed between the magnetic tape and the magnetic head, improving a data transfer rate.

Recently, in the helical scan method, a technology is proposed to use a magnetoresistive effect magnetic head (hereafter referred to as the MR head) for a reproducing head. The magnetoresistive effect magnetic head is widely used as a reproducing magnetic head for hard disk drives and the like.

An MR head is a magnetic head which reads signals from a magnetic recording an medium using magnetoresistive effect of a magnetoresistive effect element (hereafter referred to as the MR element). A pair of substrates is integrally joined through the intermediation of a gap. The gap contains a thin-film formed MR element which provides magnetoresistive effect. The width of the thin-film formed MR element determines the track width for the MR head, easily providing narrow tracks. The MR head provides high reproduction sensitivity because the MR element is exposed from a face opposite a magnetic recording medium.

Accordingly, it is expected to narrow recording tracks and record or reproduce signals with a higher density by using the MR head having the above-mentioned features as a reproducing head for the helical scan method.

A widely used MR head is of a shield type. This type of MR head contains an MR element formed in an inter-shield gap between a pair of magnetic shields. The shield type MR head provides better frequency characteristics and higher resolution than a non-shield type MR head which uses an MR element formed between a pair of nonmagnetic materials.

Widely known is the thin film shield-type MR head which uses a soft magnetic thin film for a pair of magnetic shields. By contrast, a substrate shield type MR head uses soft magnetic substrates for a pair of magnetic shields. Compared to this substrate shield type MR head, the thin film shield-type MR head provides easy control of a gap between a pair of magnetic shields, namely control of an inter-shield gap thickness, and excellent frequency characteristics.

According to the above-mentioned reasons, the thin film shield-type MR head is considered to be optimal as a reproducing head for the helical scan method.

Conventionally, an inductive bulk head is used for the helical scan method. When the thin film shield-type MR head is used as a reproducing head for the helical scan method, a pair of guard materials is integrally joined in the same manner as the inductive bulk head. A magnetic sensor is provided between the joint surfaces. The thin film shield-type MR head having this structure is formed optimally for the helical scan method.

Sometimes, a soft magnetic thin film as the magnetic shield is peeled off or a chip is damaged while the thin film shield-type MR head is formed to a shape optimal for the helical scan method. Using such a defective thin film shield-type MR head as a reproducing head for the helical scan method may damage a magnetic tape. Especially, in the helical scan method, the magnetic head fast slides in contact with the magnetic tape. When the thin film shield-type MR head as a reproducing head is defective, there is the high possibility of damaging the magnetic tape.

Recent research has shown that such a defect on the thin film shield-type MR head is caused by a thermal expansion coefficient difference between a substrate as a guard material and the soft magnetic thin film as a magnetic shield formed on this substrate.

It is a general practice to perform the heat treatment after forming the soft magnetic thin film as a magnetic shield for improving magnetic characteristics thereof The soft magnetic thin film differs from the substrate in thermal expansion coefficients. Because of this, while the soft magnetic thin film is heated, a stress is applied to these interfaces and may cause a crack. If an interface between the soft magnetic thin film and the substrate cracks, the shield thin film may peel off or a chip may be damaged during the process of forming the thin film shield-type MR head to a shape optimal for the helical scan method.

A strong stress is applied to easily crack the interface especially when there is a large contact area between the soft magnetic thin film and the substrate, namely, when the soft magnetic thin film is widely formed on the substrate.

BRIEF SUMMARY OF THE INVENTION

The present invention has been made in consideration of the foregoing. It is therefore an object of the present invention to provide an appropriate MR head as a reproducing head for the helical scan method. It is another object of the present invention to provide a rotary magnetic head apparatus using this MR head. Thereby, the soft magnetic thin film is prevented from being peeled off. Chips are prevented from being damaged.

In the magnetoresistive effect magnetic head according to the present invention, an inter-shield gap is formed between joint surfaces of a pair of guard materials through the intermediation of a pair of magnetic shield thin films. A magnetoresistive effect element is provided in the inter-shield gap. A groove is formed lengthwise at both lateral ends of a sliding surface opposite a magnetic recording medium. This groove restricts a contact width of the magnetoresistive effect magnetic head against the magnetic recording medium. The width of the pair of magnetic shield thin films is larger than the magnetoresistive effect element width and is smaller than the contact width.

Namely, the magnetoresistive effect magnetic head is configured to be of so-called thin film shield type. The width of a pair of magnetic shield thin films is larger than the magnetoresistive effect element width and is smaller than the contact width.

If the width of the pair of magnetic shield thin films is smaller than the magnetoresistive effect element width, a sufficient magnetic shield effect is unavailable. If the width of the pair of magnetic shield thin films is too large, a large contact area results between the magnetic shield thin film and the guard material. These interfaces may crack due to differences in thermal expansion coefficients. This may cause the magnetic shield thin film to peel off or the guard material to be damaged.

In the magnetoresistive effect magnetic head according to the present invention, the width of the pair of magnetic shield thin films is larger than the magnetoresistive effect element width and is smaller than the contact width. The magnetic shield thin film can provide a sufficient magnetic shield effect. A contact area can be controlled between the magnetic shield thin film and the guard material. This effectively suppresses cracks on the interfaces and prevents the magnetic shield thin film from peeling off and the guard material from being damaged.

The rotary magnetic head apparatus according to the present invention comprises an apparatus body having a stationary drum and a rotary drum, and a reproducing magnetic head. The rotary drum is mounted rotatively with reference to the stationary drum. The reproducing magnetic head is mounted on a rotary drum side of the apparatus body. In the reproducing magnetic head of this rotary magnetic head apparatus, an inter-shield gap is formed between joint surfaces of a pair of guard materials through the intermediation of a pair of magnetic shield thin films. The reproducing magnetic head is a magnetoresistive effect magnetic head whose inter-shield gap contains a magnetoresistive effect element. A groove is formed lengthwise at both lateral ends of a sliding surface opposite a magnetic recording medium. This groove restricts a contact width of the magnetoresistive effect magnetic head against the magnetic recording medium. The width of the pair of magnetic shield thin films is larger than the of the magnetoresistive effect element width and is smaller than the contact width.

The reproducing magnetic head of the rotary magnetic head apparatus is configured as the magnetoresistive effect magnetic head of a so-called thin film shield type and is mounted on the rotary drum. As the rotary drum operates rotatively, the reproducing magnetic head moves circularly and slides in contact with a magnetic recording medium wound around a peripheral surface of the apparatus body. Based on this operation, the reproducing magnetic head reads signals from the magnetic recording medium.

In the reproducing magnetic head so configured as mentioned above, the width of the pair of magnetic shield thin films is larger than the magnetoresistive effect element width and is smaller than the contact width. The magnetic shield thin film can provide a sufficient magnetic shield effect. A contact area can be restricted between the magnetic shield thin film and the guard material. This effectively suppresses cracks on the interfaces and prevents the magnetic shield thin film from peeling off and the guard material from being damaged.

As mentioned above, the rotary magnetic head apparatus according to the present invention uses as the reproducing magnetic head a magnetoresistive effect magnetic head which effectively suppresses magnetic shield thin film peeling, guard material defects, and the like. It is possible to properly read signals from a magnetic recording medium without damaging the magnetic recording medium when the reproducing magnetic head slides in contact with it.

In the magnetoresistive effect magnetic head according to the present invention, the width of a pair of magnetic shield thin films is larger than the magnetoresistive effect element width. The magnetic shield thin film can provide a sufficient magnetic shield effect. The width of the pair of magnetic shield thin films is smaller than the contact width, thus restricting a contact area can be controlled between the magnetic shield thin film and the guard material. This effectively suppresses cracks on the interfaces and prevents the magnetic shield thin film from peeling off and the guard material from being damaged.

Further, the rotary magnetic head apparatus according to the present invention uses as the reproducing magnetic head a magnetoresistive effect magnetic head which effectively suppresses magnetic shield thin film peeling, guard material defects, and the like. It is possible to properly read signals from a magnetic recording medium without damaging the magnetic recording medium when the reproducing magnetic head slides in contact with it.

DETAILED DESCRIPTION OF THE INVENTION

Embodiments of the present invention will be described in detail, with reference to the accompanying drawings.

Figure 1:
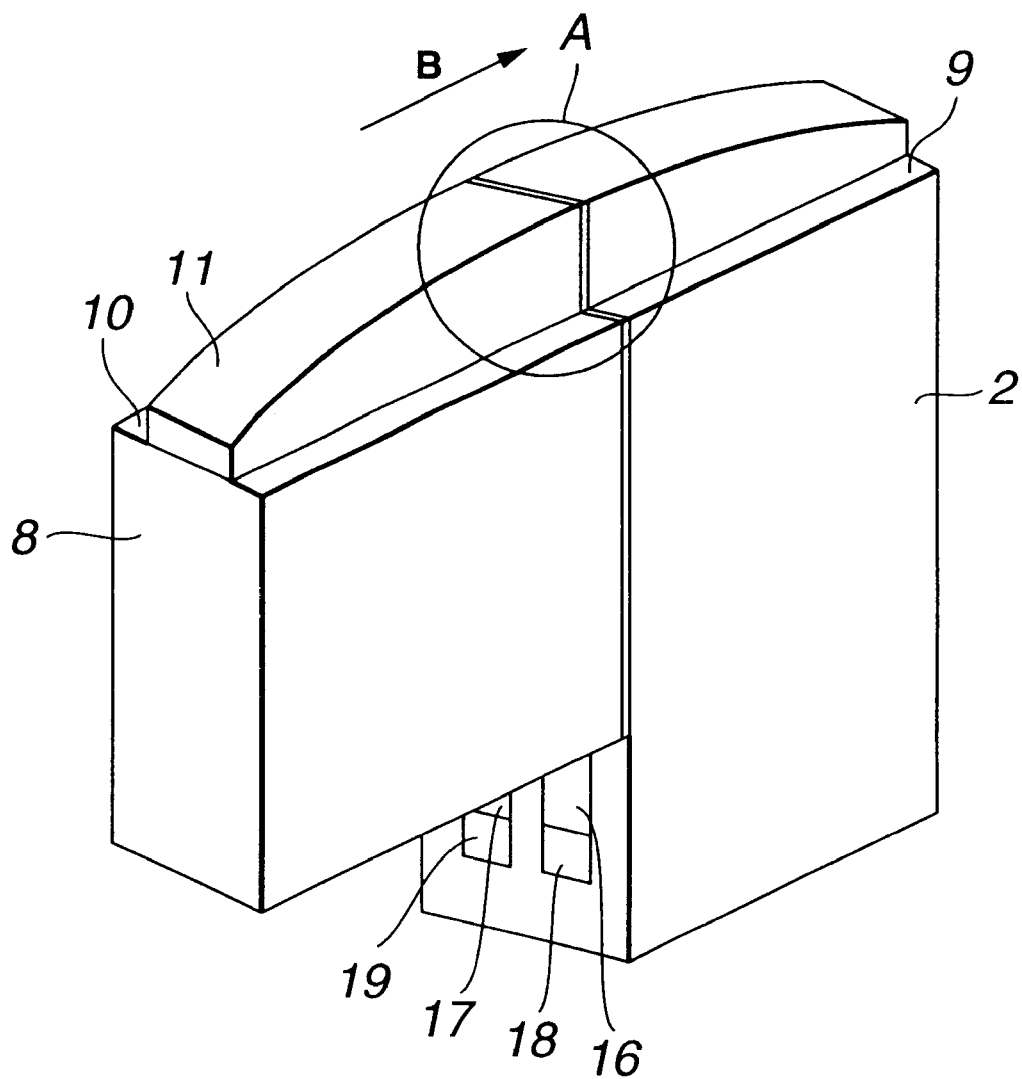
FIG. 1 is a perspective view showing an MR head according to the present invention.
Figure 2:
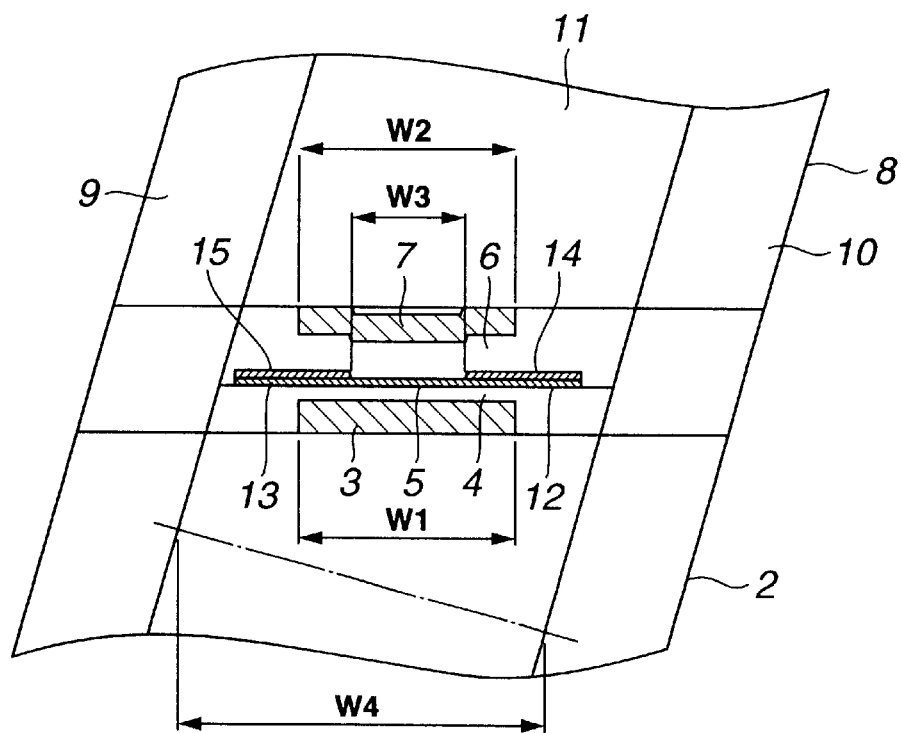
FIG. 2 is a schematic diagram of portion A in FIG. 1 viewed from the sliding surface side.

FIGS. 1 and 2 illustrate a magnetoresistive effect magnetic head, as an example, to which the present invention is applied. The magnetoresistive effect magnetic head (hereafter referred to as an MR head 1) comprises a first substrate 2, a first soft magnetic thin film (hereafter referred to as a lower shield thin film 3), a nonmagnetic nonconductive film (hereafter referred to as a lower gap film 4), a magnetoresistive effect element (hereafter referred to as an MR element 5), a nonmagnetic nonconductive film (hereafter referred to as an upper gap film 6), a second soft magnetic thin film (hereafter referred to as an upper shield thin film 7), and a second substrate 8. The lower shield thin film 3 is formed on the first substrate 2. The lower gap film 4 is formed on the lower shield thin film 3. The MR element 5 is formed on the lower gap film 4. The upper gap film 6 is formed on the MR element 5. The upper shield thin film 7 is formed on the upper gap film 6. The second substrate 8 is joined onto the upper shield thin film 7 through the use of adhesive.

The MR head 1 contains a pair of guard materials comprising a pair of integrally joined substrates 2 and 8. Between joint surfaces for the pair of substrates 2 and 8, there are provided the lower gap film 4, the MR element 5, and the upper gap film 6 sandwiched by the lower shield thin film 3 and the upper shield thin film 7. The lower gap film 4 and the upper gap film 6 constitute an inter-shield gap. The MR element 5 is provided in the inter-shield gap. One end of the MR element 5 is exposed outward from a sliding surface (hereafter referred to as a tape sliding surface 11) opposite the magnetic tape as a recording medium. The exposed portion functions as a magnetic sensor.

FIG. 1 is a perspective view of the MR head 1 according to the present invention. FIG. 2 is an enlarged top view of portion A in FIG. 1, viewed from the tape sliding surface 11. FIGS. 1 and 2 show each component of the MR head 1 with proportions that differ from actual ones for easy understanding of features.

The first substrate 2 and the second substrate 8, when viewed from the top, are formed in a thin rectangular plate. Each top end face is curved with a specified curvature. Two grooves 9 and 10 are formed lengthwise on the top at both end faces of the first substrate 2 and the second substrate 8 in a width direction. A portion between these grooves 9 and 10 is used as the tape sliding surface 11.

In the MR head 1, the above-mentioned grooves 9 and 10 are formed at both ends of along an MR head 1's direction (arrow B in FIG. 1) for sliding in contact with a magnetic tape. These grooves determine a width of the tape sliding surface 11, namely a contact width for the magnetic tape.

The lower gap film 4 and the upper gap film 6 constitute an inter-shield gap between a pair of shields. In the MR head 1, the MR element 5 is sandwiched between the lower gap film 4 and the upper gap film 6.

Based on magnetoresistive effect, the MR element 5 reads signals from a magnetic recording medium such as a magnetic tape. The MR element 5 changes a resistance value according to a change in the magnetization direction from an initial direction due to a magnetic field from the magnetic recording medium. The MR head 1 reads signals from the magnetic recording medium by detecting a change in resistance values of the MR element 5.

At both ends of the MR element 5 in the track direction, a pair of stabilization films 12 and 13 is provided for making the MR element 5 single-domain. The stabilization films 12 and 13 are provided with a pair of resistance decreasing films 14 and 15 for decreasing resistance values of the MR element 5 and portions electrically connected thereto.

Furthermore, the MR head 1 is provided with a pair of conductors 16 and 17 for supplying the MR element 5 with a sense current. Thereby, one end of each of the conductors 16 and 17 is connected to a pair of stabilization films 12 and 13. The pair of conductors 16 and 17 is electrically connected to the MR element 5 via a pair of stabilization films 12 and 13.

On the other end of each of the conductors 16 and 17, there is provided each of external connection terminals 18 and 19 which are connected to external circuits. End faces of the external connection terminals 18 and 19 are exposed outward and are connected to lead wires and the like.

The lower shield thin film 3 and the upper shield thin film 7 function as a pair of magnetic shields and are provided between joint surfaces for the first substrate 2 and the second substrate 8. Thereby, the lower shield thin film 3 and the upper shield thin film 7 sandwich the lower gap film 4 and the upper gap film 6 constituting the inter-shield gap and the MR element 5 provided in the inter-shield gap.

A lower shield thin film 3's width W1 and an upper shield thin film 7's width W2 each are larger than an MR element 5's width W3. The width W1 and the width W2 each are smaller than a tape sliding surface 11's width which is restricted by two grooves 9 and 10 and corresponds to a contact width W4 for a magnetic tape. Especially, it is desirable that a ratio of W1 or W2 to W4 be 7/8 or less.

A joint surface between the first substrate 2 and the second substrate 8 slants at a specified azimuth angle with reference to a direction orthogonal to the slide direction indicated by the arrow B in FIG. 1 for a magnetic tape. Along these joint surfaces in the slant direction, a lower shield thin film 3's length is assumed to be its width W1; an upper shield thin film 7's length is assumed to be its width W2; and an MR element 5's length is assumed to be its width W3.

The MR head 1 so configured as mentioned above can easily provide a narrow track because the thin film MR element 5's width determines a track width. The MR head 1 also provides high reproduction sensitivity because the MR element 5 is exposed from the tape sliding surface 11.

The MR head 1 is configured as a thin film shield type for easily controlling the inter-shield gap thickness and providing excellent frequency characteristics.

In the MR head 1, the lower shield thin film 3's width W1 and the upper shield thin film 7's width W2 each are larger than the MR element 5's width W3 and are smaller than the contact width W4 for a magnetic tape. The MR head 1 allows the lower shield thin film 3 and the upper shield thin film 7 to implement sufficient magnetic shield effects. Further, the MR head 1 restricts contact areas between the lower shield thin film 3 and the first substrate 2 and between the upper shield thin film 7 and the second substrate 8. This effectively prevents the lower shield thin film 3 and the upper shield thin film 7 from peeling off, and the first substrate 2 and the second substrate 8 from being damaged.

If the lower and upper shield thin films each are narrower than the magnetoresistive effect element, the thin film shield-type MR head cannot provide these shield thin films with sufficient magnetic shield effects. If the lower and upper shield thin films each are too wide, a large contact area results between the lower shield thin film and the first substrate and between the upper shield thin film and the second substrate. These interfaces may crack due to differences in thermal expansion coefficients. This may cause the lower shield thin film 3 and the upper shield thin film 7 to peel off or the first substrate 2 and the second substrate 8 to be damaged.

Because the width W1 and the width W2 each are larger than the width W3 and are smaller than the width W4 as mentioned above, the MR head 1 according to the present invention effectively solves the above-mentioned problems.

When a ratio of W1 or W2 to W4 is 7/8 or less, it is possible to keep a rate at which the MR head 1 becomes defective to 5% or less as shown in Table 1. If this is possible, it can be assumed that the MR head 1 is fully worthy of practical use.

TABLE 1

| | | | | | |
|---|---|---|---|---|---|
| Width of the lower and upper shield thin films each ($\mu$m) | 60 | 70 | 75 | 80 | 100 |
| Ratio of the lower and upper shield thin film widths each to the contact width | 3/4 | 7/8 | 15/16 | 1 | 5/4 |
| Rate at which a defect occurs (%) | 3 | 5 | 10 | 20 | 40 |

Contact width: 80 $\mu$m

With respect to the above-mentioned thin film shield-type MR head, Table 1 shows ratios of the lower and upper shield thin film widths each to the contact width, rates at which a defect occurs, and relationship between these factors. This table lists rates for causing defects by changing widths of the lower and upper shield thin films in the MR head with the contact width set to 80 $\mu$m.

Figure 3:
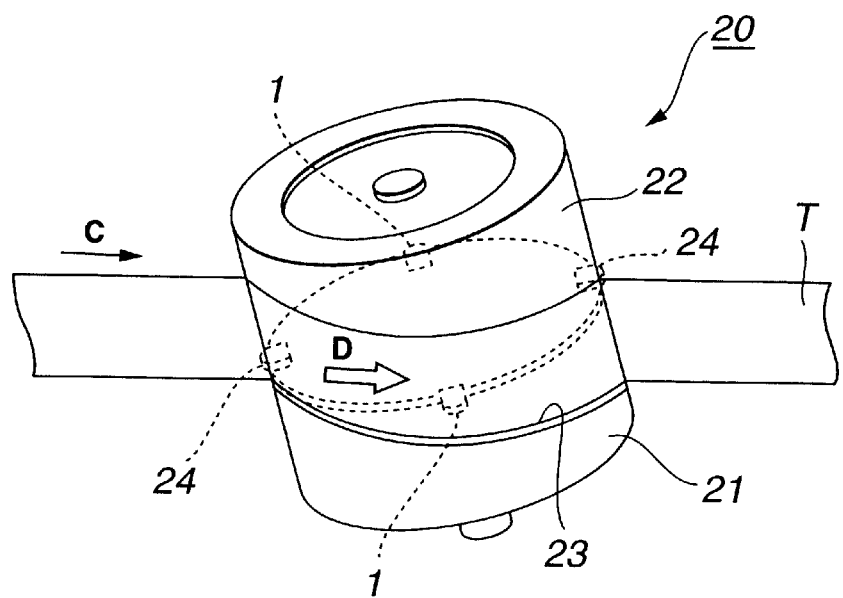
FIG. 3 is a perspective view showing a rotary magnetic head apparatus using the MR head as a reproducing magnetic head.

For example, the MR head 1 so configured as mentioned above is mounted on a rotary magnetic head apparatus 20 shown in FIG. 3.

The rotary magnetic head apparatus 20 in FIG. 3 is used for a recording/reproducing apparatus configured to record or reproduce signals from a magnetic tape T according to the helical scan method. A magnetic tape T is guided into a tape path system and passes through a specified path in the recording/reproducing apparatus. The magnetic head slides in contact with the magnetic tape T's recording surface to write signals to or read signals from the magnetic tape T.

In its entirety, the rotary magnetic head apparatus 20 is formed almost cylindrically and comprises a stationary drum 21 and a rotary drum 22. The stationary drum 21 is fixed in the recording/reproducing apparatus. The rotary drum 22 is provided coaxially with the stationary drum 21 and is rotatively driven by a motor.

The stationary drum 21 is formed of a metal material such as aluminum with a specified thickness in an almost disk shape. A tape guide groove 23 is provided on the peripheral surface of the stationary drum 21 for guiding a wind of the magnetic tape T and maintaining its position. The tape guide groove 23 is formed with a specified inclination angle with reference to a direction orthogonal to a center axis of the stationary drum 21. The magnetic tape T is supported at its bottom by the tape guide groove 23 provided on the peripheral surface of the stationary drum 21. With this state, the magnetic tape T is wound on the peripheral surface of the rotary magnetic head apparatus 20.

Like the stationary drum 21, the rotary drum 22 is formed of a metal material such as aluminum with a specified thickness in an almost disk shape. The rotary drum 22 has a motor shaft inserted into its center and is driven and rotated by a motor.

The rotary drum 22 is provided with an inductive-type magnetic head 24 as a recording head for writing signals onto the magnetic tape T. The above-mentioned MR head 1 is mounted as a reproducing head for reading signals from the magnetic tape T where signals are written. These magnetic heads are supported by a head support substrate. With this state, these magnetic heads are mounted on the rotary drum 22 so that the corresponding tip of each head faces outward from the peripheral surface of the rotary magnetic head apparatus 20.

The rotary magnetic head apparatus 20 having the above-mentioned configuration is provided in the recording/reproducing apparatus according to the helical scan method. As shown in FIG. 3, the magnetic tape T is guided by the tape path system and moves in the direction of an arrow C. This tape is wound on the peripheral surface of the rotary magnetic head apparatus 20 at a wind angle of, say, 180 degrees. At this time, the magnetic tape T is wound along the tape guide groove 23 formed on the peripheral surface of the stationary drum 21. Accordingly, the tape is slantly wound on the peripheral surface of the rotary magnetic head apparatus 20.

The rotary drum 22 is rotatively operated with the magnetic tape T wound on the peripheral surface of the rotary magnetic head apparatus 20. As the rotary drum 22 rotates, the recording magnetic head 24 and the reproducing MR head 1 mounted on the rotary drum 22 move in the direction of an arrow D in FIG. 3 along the peripheral surface of the rotary magnetic head apparatus 20. These heads slide slantly in contact with the recording surface of the magnetic tape T wound on the peripheral surface of the rotary magnetic head apparatus 20. This operation writes signals to or reads signals, if any, from the signal recording surface of the magnetic tape T.

The rotary magnetic head apparatus 20 uses the above-mentioned MR head 1 as a reproducing magnetic head, narrowing recording tracks and recording or reproducing signals with a high density.

In this rotary magnetic head apparatus 20, the MR head 1 used as a reproducing magnetic head has a structure which is protected against peeling of the lower shield thin film 3 and the upper shield thin film 7 or voids in the first substrate 2 and the second substrate 8 used as guard material. The rotary magnetic head apparatus 20 using this MR head 1 as a reproducing magnetic head can properly record or reproduce signals on the magnetic tape T without damaging it.

The following describes a manufacturing method for the above-mentioned MR head 1. Like FIGS. 1 and 2, characteristic portions may be enlarged in drawings used for the following description for easy understanding of features. Dimensional proportions of each member are not necessarily the same as actual ones.

The following description provides actual examples of constituent members of the MR head 1, their materials, sizes, thicknesses, and the like. However, the present invention is not limited to the following examples. For example, the following description provides an example which uses an MR element 4 according to the so-called SAL (Soft Adjacent Layer) bias method. This MR element has a structure similar to that put into practical use for hard disk apparatuses and the like. However, the bias method is not limited to this example.

First, there is provided a disk-shaped first substrate 30 having a diameter of four inches to be used as the first substrate 2 for manufacturing the MR head 1 according to the present invention. Mirror polishing is applied to a surface of the first substrate 30. On the first substrate 30, there are formed many head devices each of which finally becomes the MR head 1.

The first substrate 30 finally becomes the first substrate 2 as a guard material and is made of soft magnetic ferrite with great hardness. For example, an optimal material is Ni—Zn or Mn—Zn ferrite.

Figure 4:
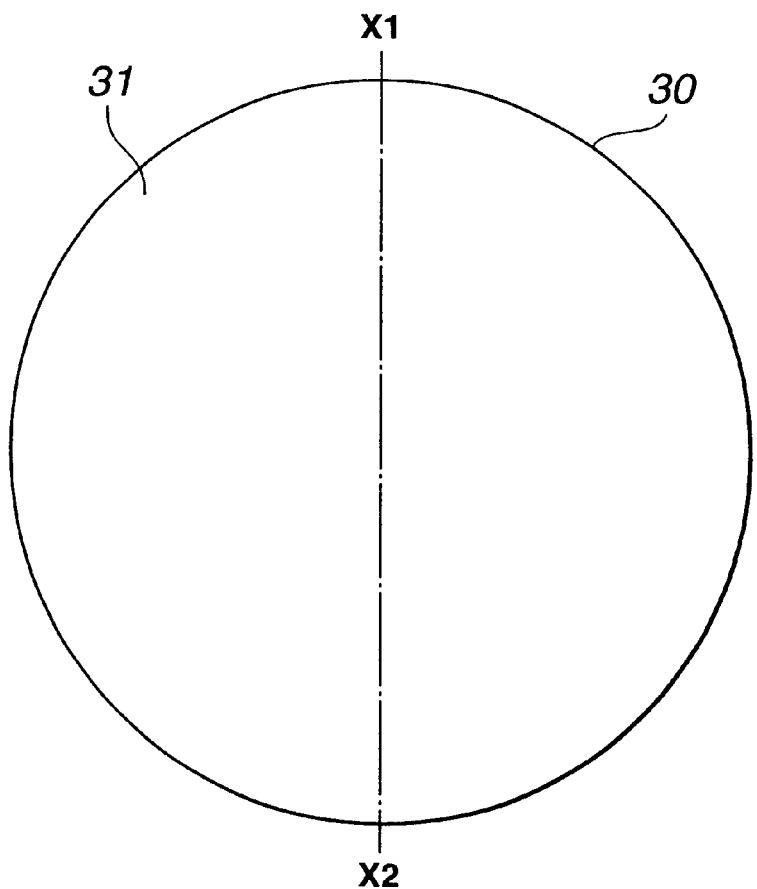
FIG. 4 is a top view showing that a soft magnetic thin film is formed as a lower shield thin film on a first substrate, explaining a manufacturing process for the MR head.
Figure 5:
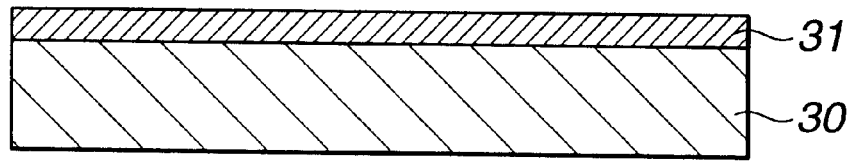
FIG. 5 is a cross-sectional view taken in the line X1–X2 of FIG. 4, explaining a manufacturing process for the MR head.

As shown in FIGS. 4 and 5, a soft magnetic thin film 31 is formed on the first substrate 30 through the use of sputtering and the like. The soft magnetic thin film 31 finally becomes the lower shield thin film 3. For example, it is desirable to use an Ni—Fe alloy film for the soft magnetic thin film 31.

Figure 6:
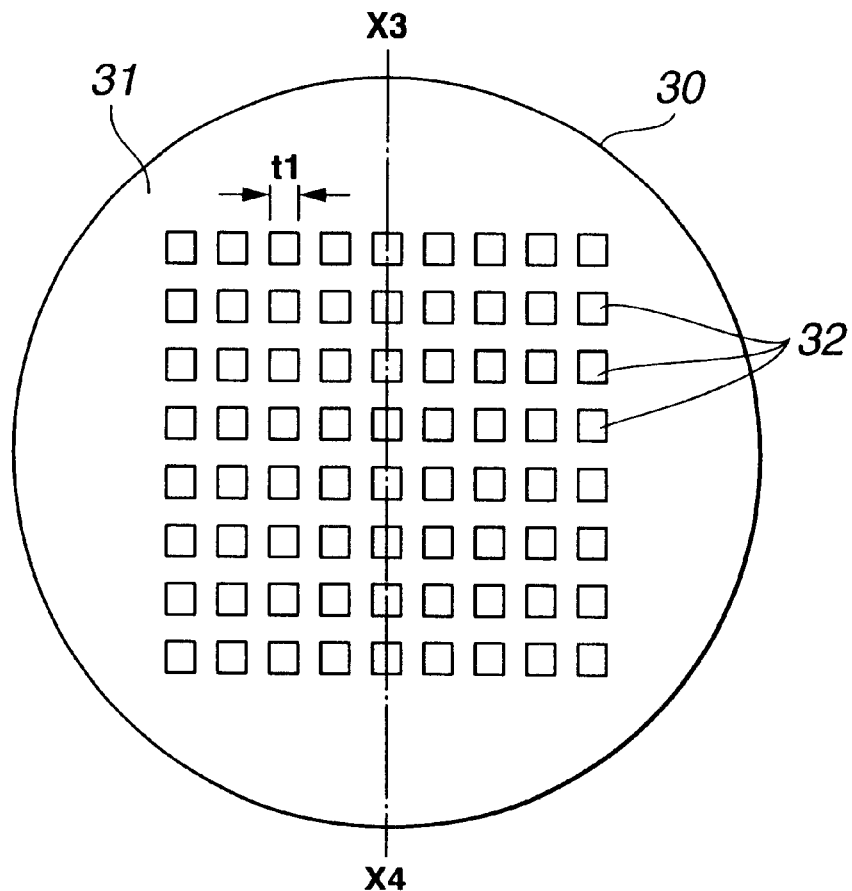
FIG. 6 is a top view showing that a resist layer is formed on a soft magnetic thin film as a lower shield thin film, explaining a manufacturing process for the MR head.
Figure 7:
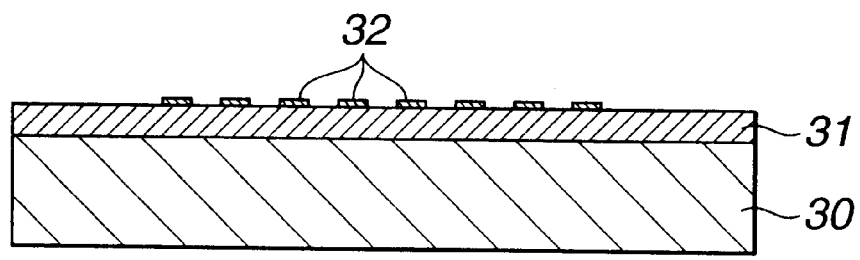
FIG. 7 is a cross-sectional view taken in the line X3–X4 of FIG. 6, explaining a manufacturing process for the MR head.

As shown in FIGS. 4 and 5, the photolithography process is used to form a resist film 32 on the soft magnetic thin film 31. A shape of the resist film 32 corresponds to the lower shield thin film 3 of the finally fabricated MR head 1. The resist film 32 is formed for each of many head devices formed on the first substrate 30. Specifically, when forming the resist film 32, a length t1 in FIG. 6 should be larger than the MR element 5's width W3 in the final MR head 1 and should be smaller than the contact width W4. For example, the length t1 is approximately 60 µm.

Figure 8:
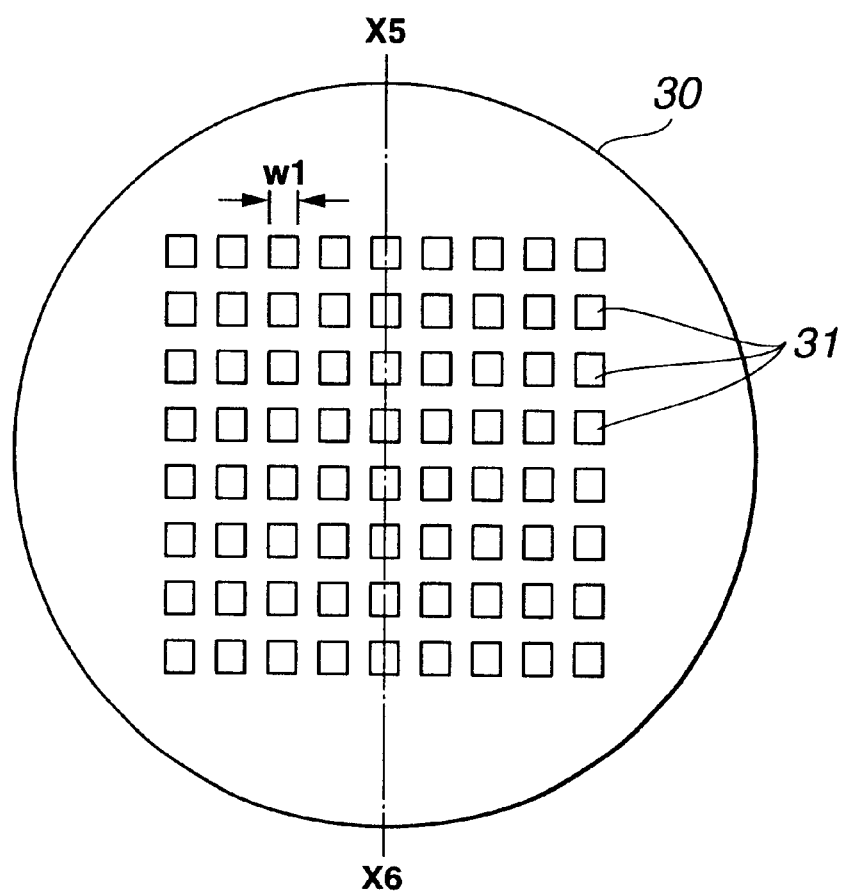
FIG. 8 is a top view showing that a soft magnetic thin film is formed as a lower shield thin film, explaining a manufacturing process for the MR head.
Figure 9:
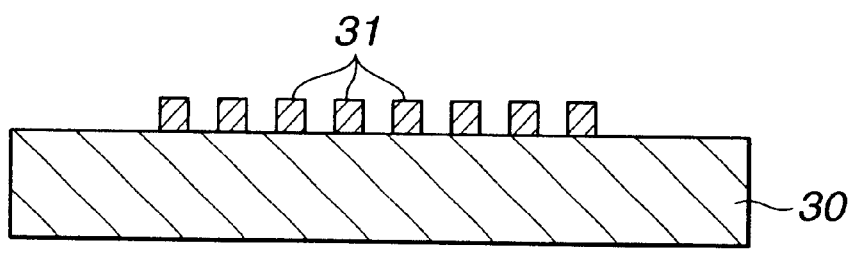
FIG. 9 is a cross-sectional view taken in the line X5–X6 of FIG. 8, explaining a manufacturing process for the MR head.

After etching is performed by using the resist film 32 as a mask, the resist film 32 is removed. As shown in FIGS. 8 and 9, the soft magnetic thin film 31 is formed to a shape of the lower shield thin film 3 for the complete MR head 1. Namely, according to this shape, the width W1 is larger than the width W3 of the MR element 5 in the complete MR head 1 and is smaller than the contact width W4.

Then, annealing is applied to the soft magnetic thin film 31 which becomes the lower shield thin film 3. This annealing performs heat treatment by applying a magnetic field to the soft magnetic thin film 31 for improving magnetic characteristics of the soft magnetic thin film 31.

Figure 10:
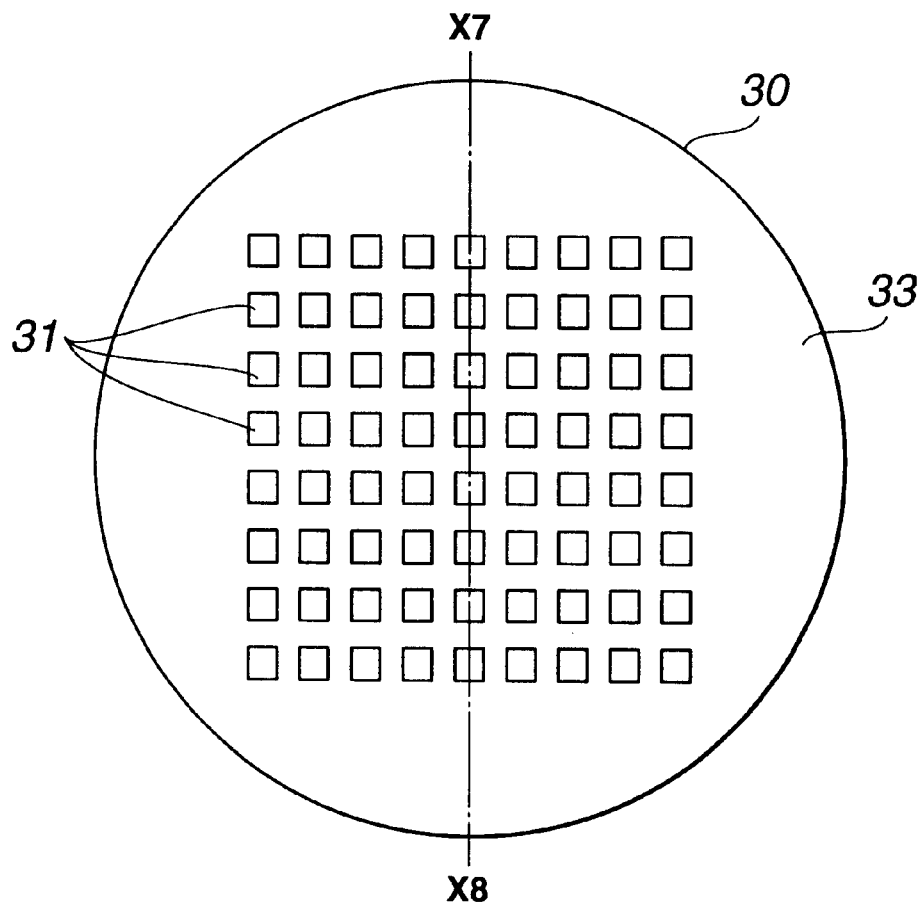
FIG. 10 is a top view showing that a nonmagnetic nonconductive film is formed to fill a gap between adjacent soft magnetic thin films, explaining a manufacturing process for the MR head.
Figure 11:
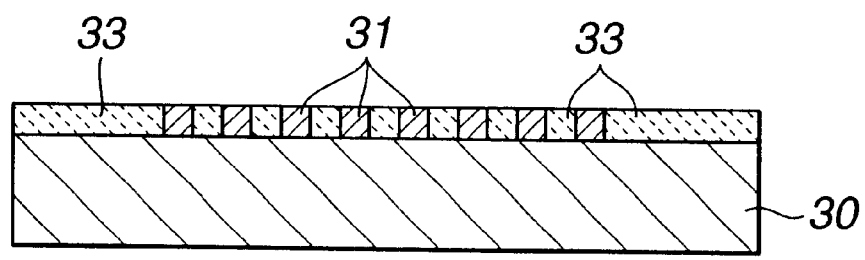
FIG. 11 is a cross-sectional view taken in the line X7–X8 of FIG. 10, explaining a manufacturing process for the MR head.

Then, sputtering and the like is used to form a nonmagnetic nonconductive film 33 on the first substrate 30 where the soft magnetic thin film 31 (finally the lower shield thin film 3) is formed. At this time, the surface of the nonmagnetic nonconductive film 33 is flattened. Subsequently, as shown in FIGS. 10 and 11, the nonmagnetic nonconductive film 33 fills a gap between the adjacent soft magnetic thin films 31.

Figure 12:
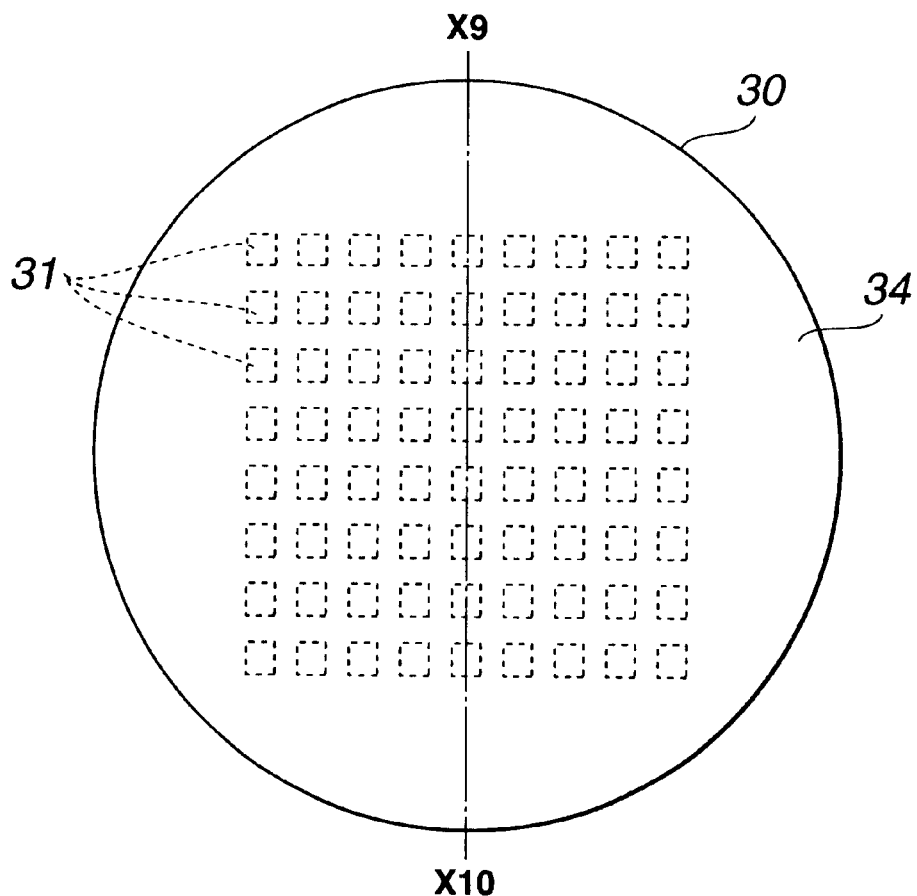
FIG. 12 is a top view showing that a nonmagnetic nonconductive film is formed as a lower gap film, explaining a manufacturing process for the MR head.
Figure 13:
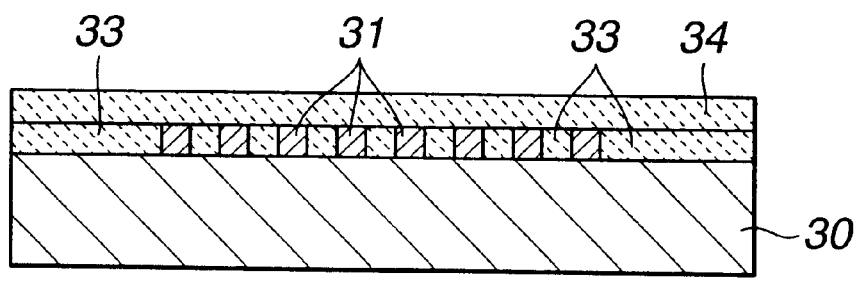
FIG. 13 is a cross-sectional view taken in the line X9–X10 of FIG. 12, explaining a manufacturing process for the MR head.

As shown in FIGS. 12 and 13, sputtering and the like is used to form a nonmagnetic nonconductive film 34 (finally the lower gap film 4) on the first substrate 30 where the nonmagnetic nonconductive film 33 is formed. As mentioned above, the surface of the first substrate 30 is flattened. An optimal material for the nonmagnetic nonconductive film 34 is $Al_2O_3$ from the viewpoint of insulating characteristics, wear-resistant properties, and the like. It is allowed to determine a thickness of the nonmagnetic nonconductive film 41 according to recording signal frequencies and the like. In this example, the film thickness is set to 190 nm.

Figure 14:
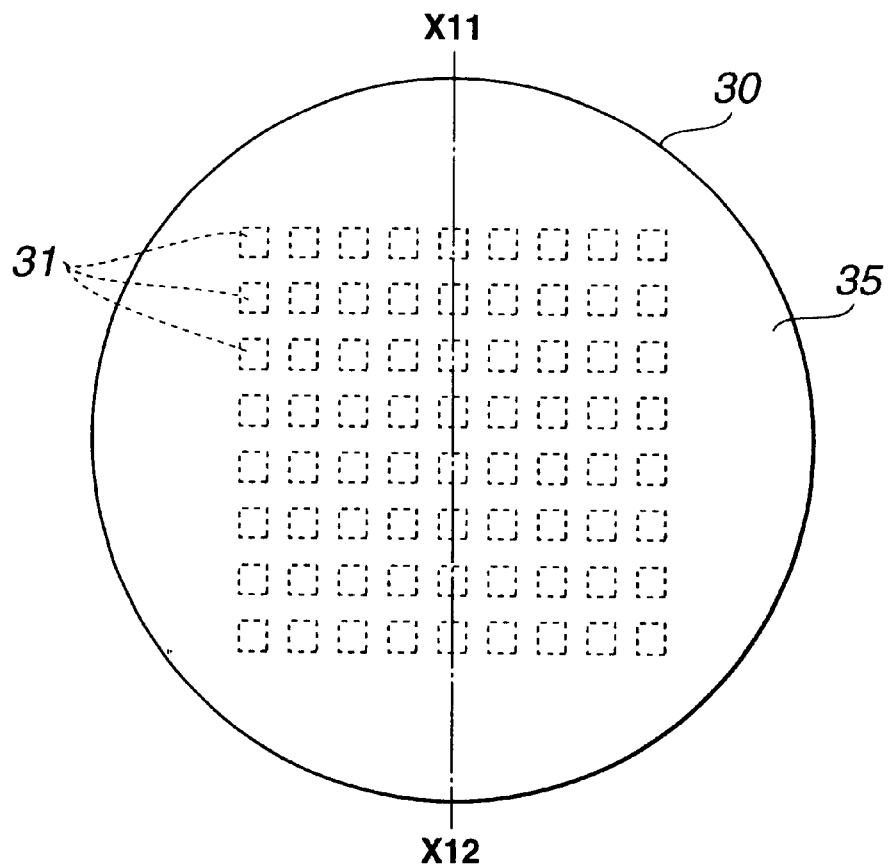
FIG. 14 is a top view showing that an MR element thin film is formed on a nonmagnetic nonconductive film as a lower gap film, explaining a manufacturing process for the MR head.
Figure 15:
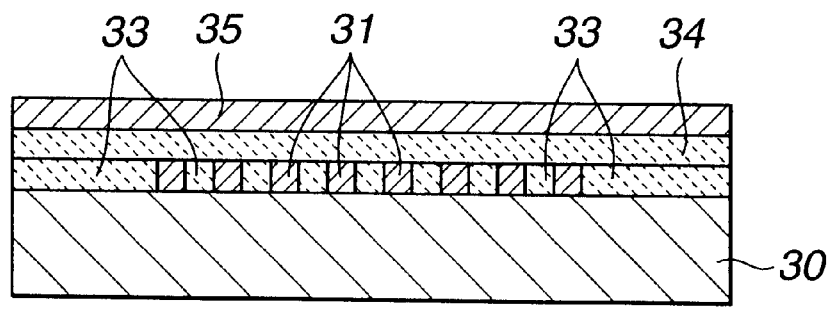
FIG. 15 is a cross-sectional view taken in the line X11–X12 of FIG. 14, explaining a manufacturing process for the MR head.

Then, as shown in FIGS. 14 and 15, sputtering and the like is used to form a thin film (hereafter referred to as an MR element thin film 35) constituting the MR element 5 on the nonmagnetic nonconductive film 34. In this example, the MR element 5 complies with the SAL bias method. Specifically, the MR element thin film 35 is formed as follows. For example, sputtering and the like is used to form a Ta layer approximately 5 nm thick, an NiFeNb layer approximately 43 nm thick, a Ta layer approximately 5 nm thick, an NiFe layer approximately 40 nm thick, and a Ta layer approximately 1 nm thick in this order.

In the above-mentioned MR element thin film 35, the NiFe layer is a soft magnetic film having magnetoresistive effect and functions as a magnetic sensor of the MR element 5. In addition, the NiFeNb layer finctions as an SAL film which applies a bias magnetic field to the NiFe layer.

This example does not limit materials and film thicknesses of the layers constituting the MR element thin film 35. It is allowed to select a proper material or set an optimal film thickness according to uses and the like of the MR head 1.

Figure 16:
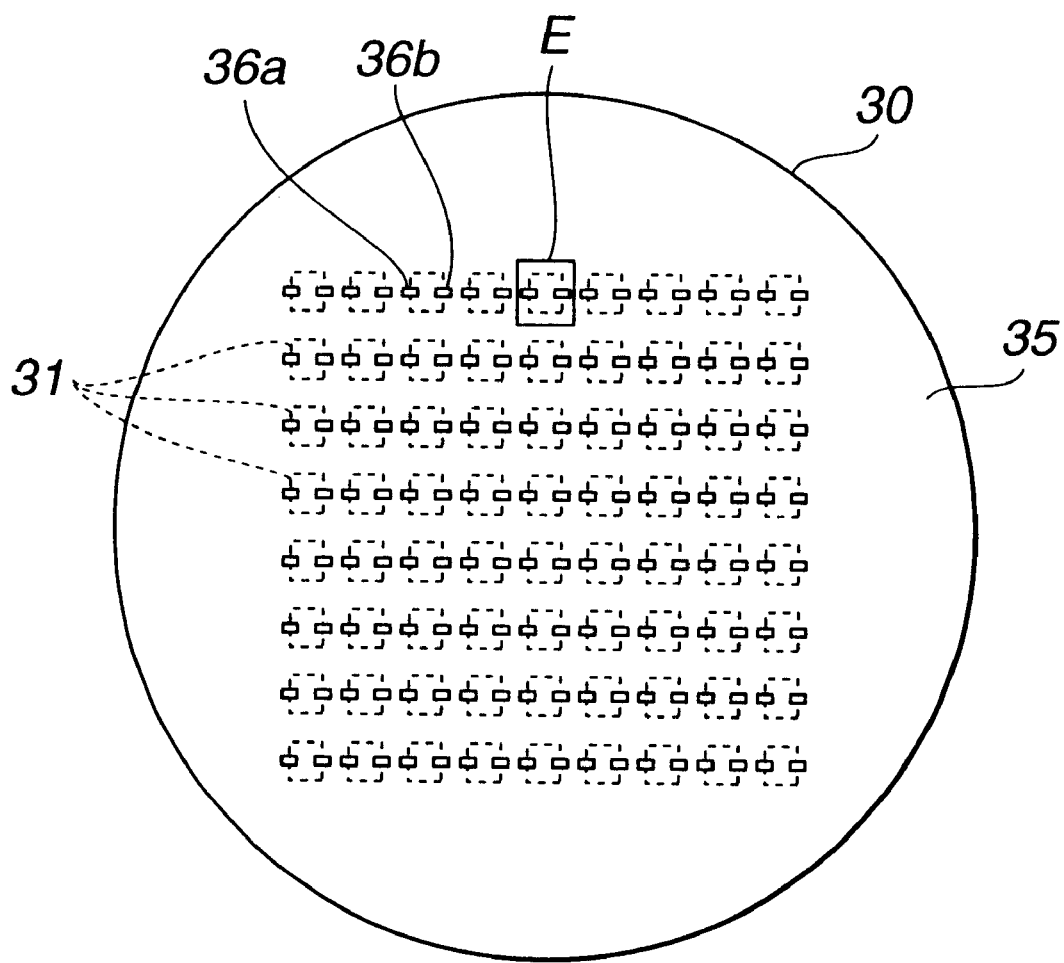
FIG. 16 is a top view showing that a pair of permanent magnet films is formed, explaining a manufacturing process for the MR head.
Figure 17:
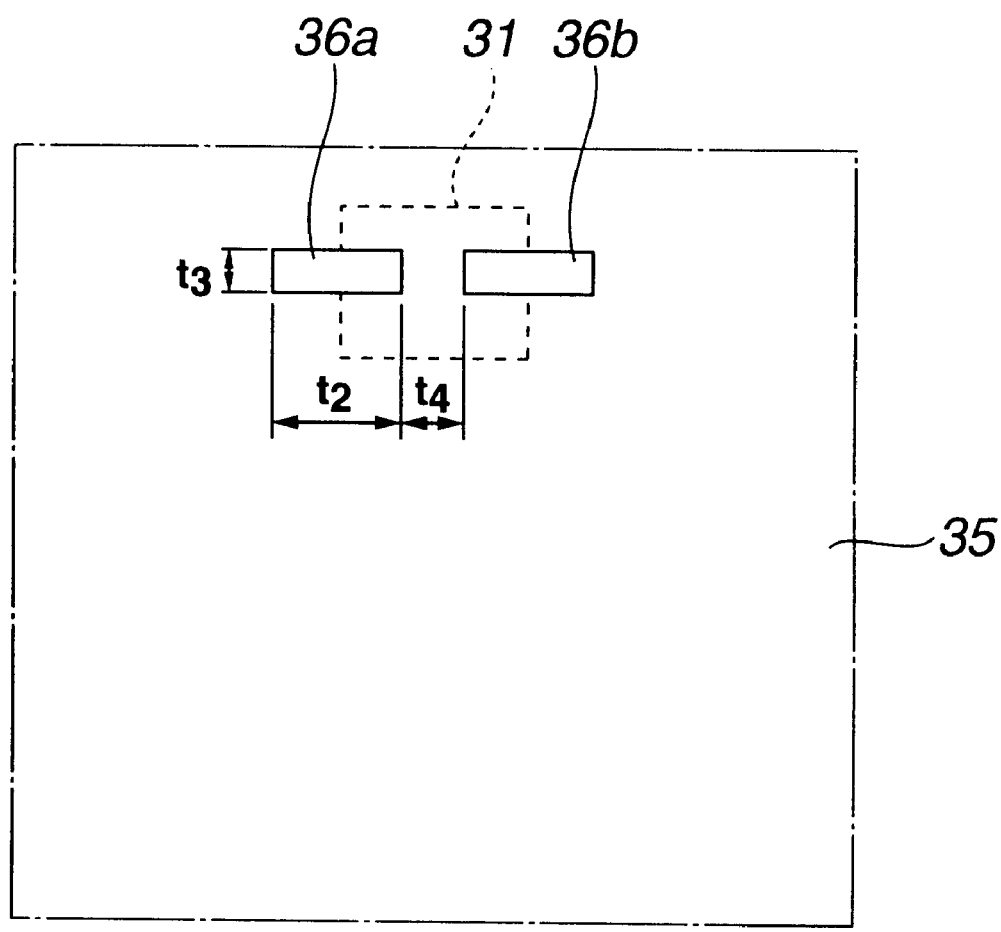
FIG. 17 is an enlarged top view of portion E in FIG. 16, explaining a manufacturing process for the MR head.

As shown in FIGS. 16 and 17, the photolithography process is used to embed two rectangular permanent-magnet films 36a and 36b for each head device in the MR element thin film 35. The permanent-magnet films 36a and 36b finally function as the stabilization films 12 and 13 for the MR head 1. As regards each of these permanent-magnet films, a longer length t2 is approximately 50 $\mu$m. A shorter length t3 is approximately 10 $\mu$m. An interval t4 between the permanent-magnet films 36a and 36b is approximately 5 $\mu$m. The interval t4 finally becomes a track width of the MR element 5. Namely, the MR head 1 will have a track width of approximately 5 $\mu$m for the MR element 5.

The MR element 5's track width is not limited to this example. It is allowed to set the track width to a proper value according to uses and the like of the MR head 1.

Figure 18:
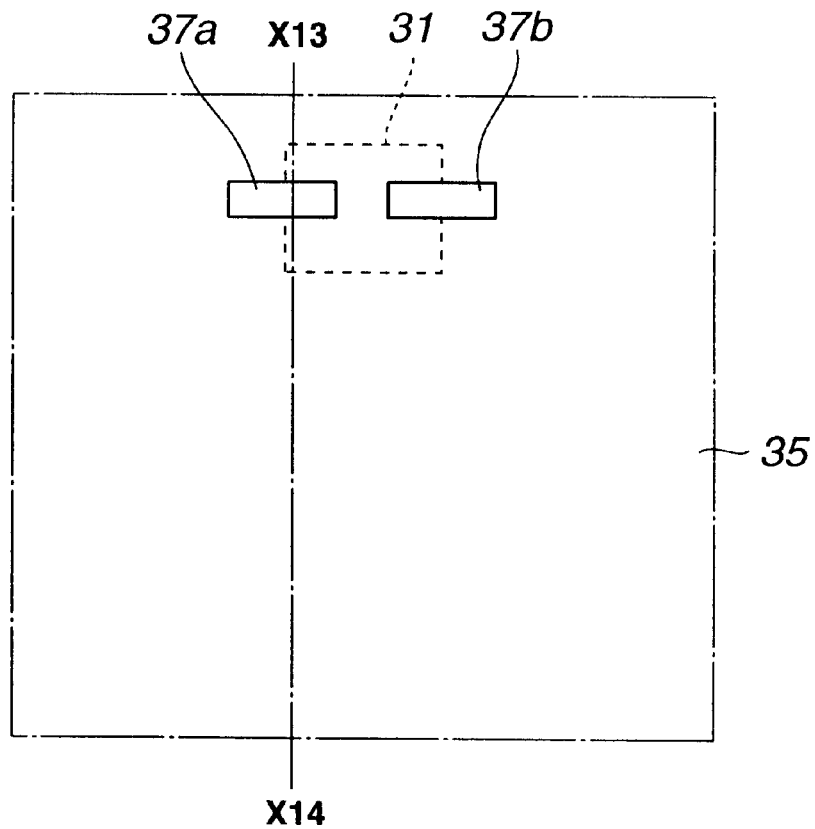
FIG. 18 is a top view showing that a pair of resistance decreasing films is formed on a pair of permanent magnet films, explaining a manufacturing process for the MR head.
Figure 19:
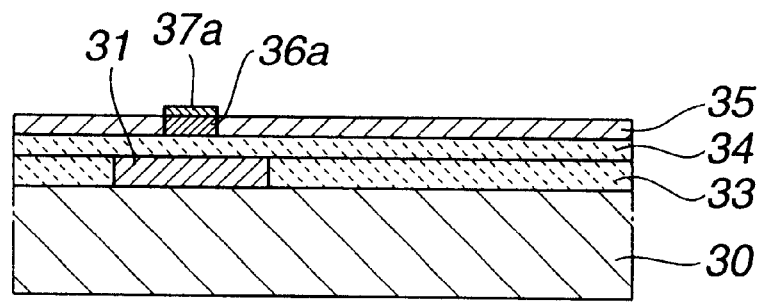
FIG. 19 is a cross-sectional view taken in the line X13–X14 of FIG. 18, explaining a manufacturing process for the MR head.

As shown in FIGS. 18 and 19, resistance decreasing films 37a and 37b with low-resistance are formed on the permanent-magnet films 36a and 36b. These resistance decreasing films decrease resistance values of the MR element 5 and portions electrically connected thereto. The resistance decreasing films 37a and 37b finally become the resistance decreasing films 14 and 15 for the MR head 1.

When embedding the permanent-magnet films 36a and 36b and the resistance decreasing films 37a and 37b in the MR element thin film 35, for example, the photo resist is used to form a mask having two rectangular openings for each head device. Then, etching is performed to remove the MR element thin film 35 exposed from the opening. This example is capable of dry or wet etching. Considering processability and the like, however, ion etching is recommended.

Then, sputtering and the like is used to form the permanent-magnet films 36a and 36b on the MR element thin film 35 where masks are formed. A material for the permanent-magnet films 36a and 36b should maintain a coercive force of 1000[Oe] or more. For example, CoNiPt or CoCrPt is recommended.

Then, sputtering and the like is used to form the resistance decreasing films 37a and 37b. For example, Cr, Ta, or the like is recommended as a material for the resistance decreasing films 37a and 37b.

A resistance value needed for an operational environment of the MR head 1, an MR element 5's track width and the like determine thicknesses of the permanent-magnet films 36a and 36b and the resistance decreasing films 37a and 37b. In this example, the thickness of the permanent-magnet films 36a and 36b is approximately the same as that of the MR element thin film 35. The thickness of the resistance decreasing films 37a and 37b is set to approximately 60 nm.

Then, the photo resist mask is removed together with permanent-magnet films and resistance decreasing films formed on the photo resist. After this process as shown in FIG. 19, the permanent-magnet films 36a and 36b and the resistance decreasing films 37a and 37b with specified patterns are embedded in the MR element thin film 35. FIGS. 17 through 19 show enlarged corresponding portions in one MR element 5 indicated by E in FIG. 16. Similarly, FIGS. 22 through 31 show enlarged corresponding portions in one MR element 5 indicated by E in FIG. 16.

Figure 20:
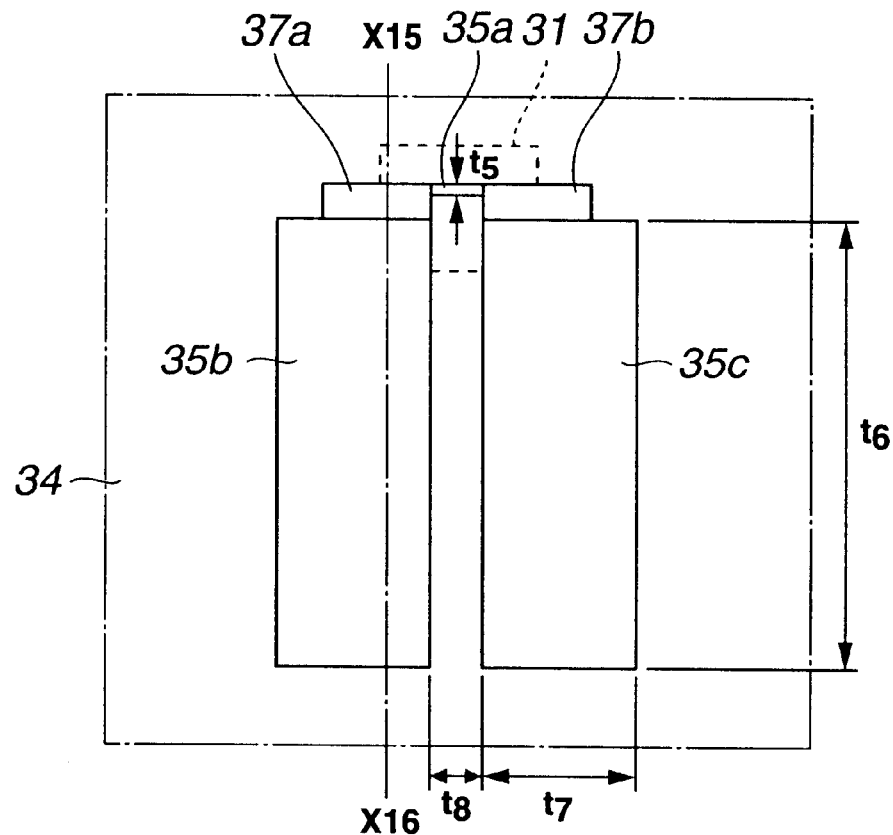
FIG. 20 is a top view showing that an MR element thin film is removed except portions thereof for an MR element and a pair of conductors, explaining a manufacturing process for the MR head.
Figure 21:
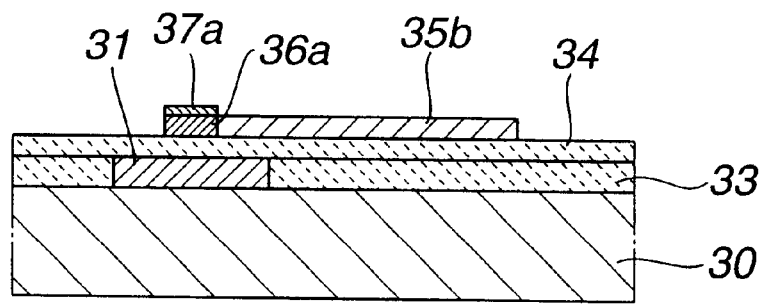
FIG. 21 is a cross-sectional view taken in the line X15–X16 of FIG. 20, explaining a manufacturing process for the MR head.

Then, as shown in FIGS. 20 and 21, the photolithography process is used to Ace remove the MR element thin film 35 by etching. This etching process leaves a portion 35a finally functioning as the MR element 5 and portions 35b and 35c finally functioning as conductors 16 and 17 which supply the MR element 5 with a sense current.

Specifically, for example, the photo resist is used to form a mask having openings for the portions 35a, 35b, and 35c for each head device.

Then, etching is performed to remove the MR element thin film 35 exposed from the opening. This example is capable of dry or wet etching. Considering processability and the like, however, ion etching is recommended.

Figure 22:
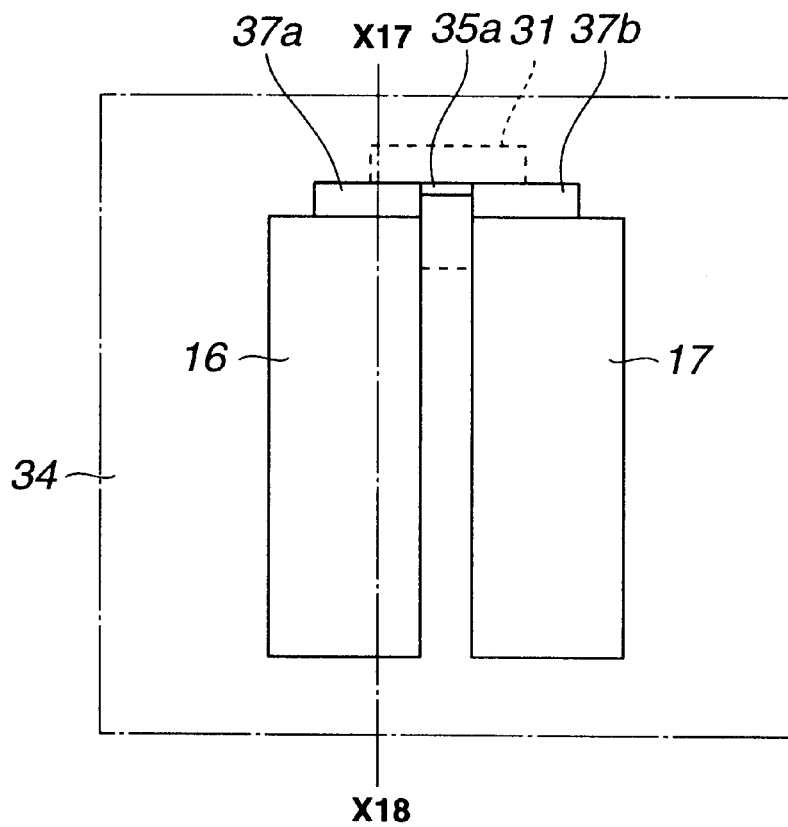
FIG. 22 is a top view showing that a pair of conductors is formed, explaining a manufacturing process for the MR head.
Figure 23:
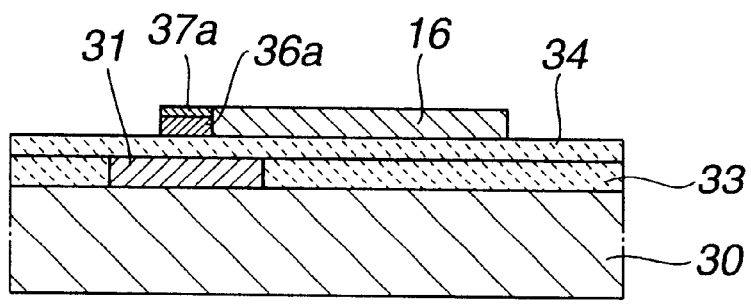
FIG. 23 is a cross-sectional view taken in the line X17–X18 of FIG. 22, explaining a manufacturing process for the MR head.

As shown in FIGS. 22 and 23, removing the photo resist mask leaves the portions 35a, 35b, and 35c of the MR element thin film 35.

According to an operational environment of the MR head 1, optimal values can be specified for a height t5 of the portion 35a (finally the MR element 5), a length t6 and a width t7 of the portions 35b and 35c (finally a pair of conductors 16 and 17), and an interval t8 between the portions 35b and 35c. In this example, the height t5 is set to approximately 4 $\mu$m. The height t5 corresponds to a depth of the MR element 5, namely a length between both ends of the tape sliding surface 11. Accordingly, the MR element 5's depth is approximately 5 $\mu$m in the MR head 1 of this example.

In this example, the length t6 of the portions 35b and 35c each is approximately 2 mm. The width t7 of each of these portions is approximately 80 $\mu$m. The interval t8 between them is approximately 40 $\mu$m. The interval t8 equals the width W3 of the MR element 5. Accordingly, the MR element 5's width W3 is approximately 40 $\mu$m in the MR head 1 of this example.

Then, as shown in FIGS. 22 and 23, the photolithography process is used to form the conductors 16 and 17 by replacing the portions 35b and 35c with a conducting layer having a smaller electrical resistance than that of the MR element thin film 35.

Specifically, the photo resist is used to form a mask with openings for the portions 35b and 35c. Then, etching is performed to remove the MR element thin film 35 remaining on the portions 35b and 35c exposed from the openings. With the photo resist mask unremoved, a conducting layer is formed thereon. At this time, the sputtering is used to form the conducting layer by developing a Ti film with the thickness of 15 nm, a Cu film with the thickness of 4 $\mu$m, and a Ti film with the thickness of 15 nm in this order. Then, the photo resist mask is removed together with the conducting layer formed thereon. This process forms a pair of conductors 16 and 17 as shown in FIGS. 22 and 23.

Figure 24:
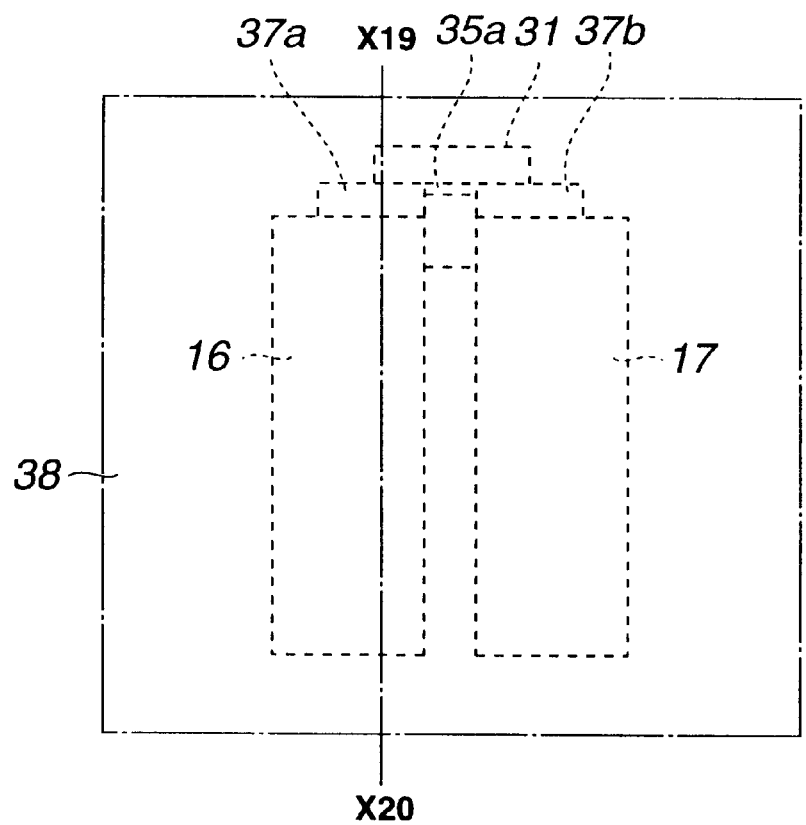
FIG. 24 is a top view showing that an MR element thin film is removed except portions thereof for an MR element and a pair of conductors, explaining a manufacturing process for the MR head.
Figure 25:
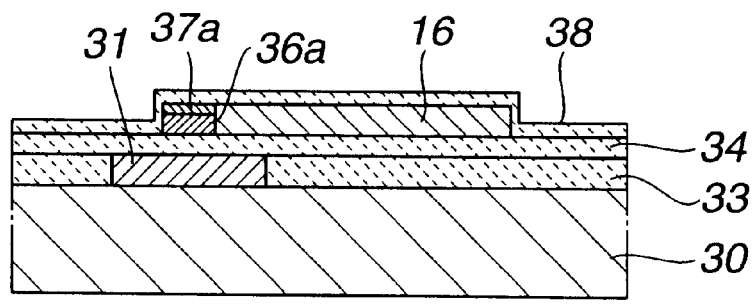
FIG. 25 is a cross-sectional view taken in the line X19–X20 of FIG. 24, explaining a manufacturing process for the MR head.

Then, as shown in FIGS. 24 and 25, the sputtering and the like is performed to form a nonmagnetic nonconductive film 38 finally functioning as the upper gap film 6 of the MR head 1. An optimal material for the nonmagnetic nonconductive film 38 is $Al_2O_3$ from the viewpoint of insulating characteristics, wear-resistant properties, and the like. It is allowed to determine a thickness of the nonmagnetic nonconductive film 38 according to recording signal frequencies and the like. In this example, the film thickness is set to approximately 180 nm.

Figure 26:
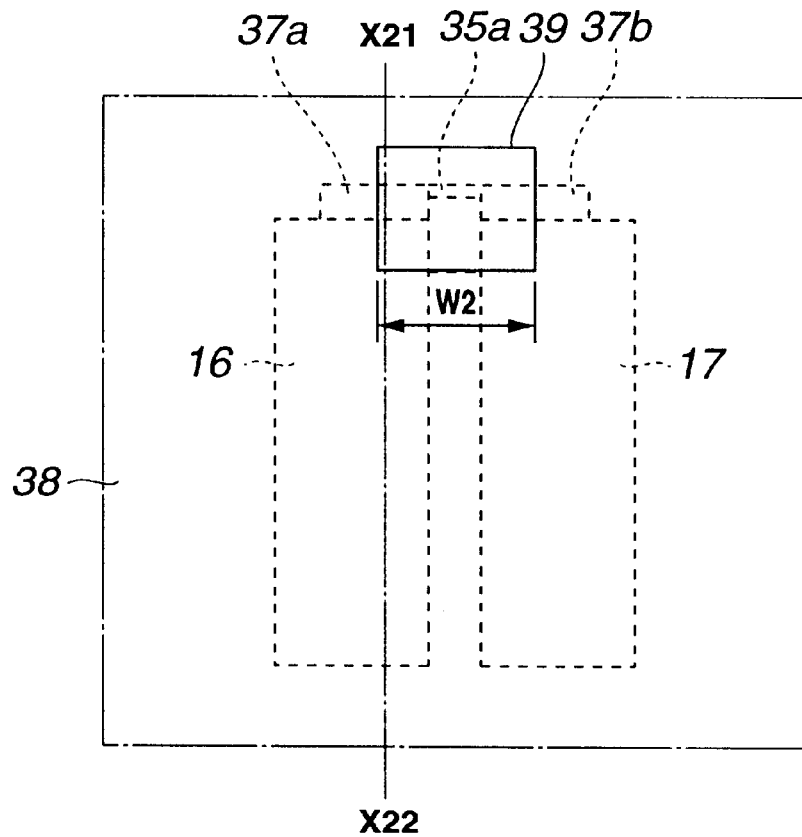
FIG. 26 is a top view showing that a soft magnetic thin film is formed as an upper shield thin film, explaining a manufacturing process for the MR head.
Figure 27:
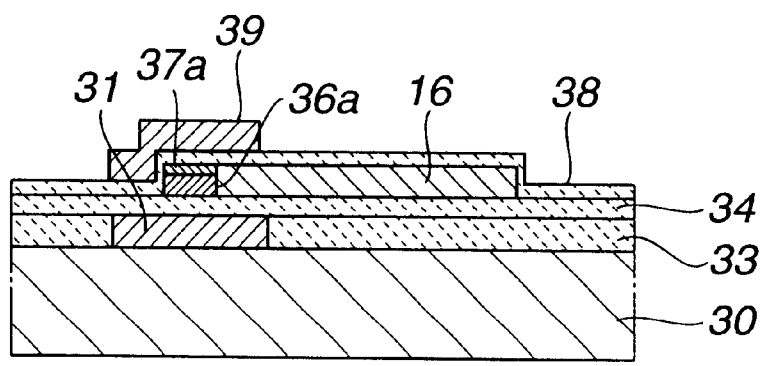
FIG. 27 is a cross-sectional view taken in the line X21–X22 of FIG. 26, explaining a manufacturing process for the MR head.

Then, as shown in FIGS. 26 and 27, the photolithography process is used to form a soft magnetic thin film 39 finally functioning as the upper shield thin film 7 of the MR head 1 on the nonmagnetic nonconductive film 38.

Specifically, the photo resist is used to form a mask with rectangular openings just on a portion where the soft magnetic thin film 31 (finally the lower shield thin film 3) is formed. Then, the sputtering and the like is performed to form a soft magnetic thin film 39 finally functioning as the upper shield thin film 7. For example, an amorphous lamination film such as CoZrNbTa and the like is recommended as a material for the soft magnetic thin film 39. The soft magnetic thin film 39 can have a thickness sufficient for providing a magnetic shield effect. In this example, this film thickness is set to approximately 2.3 μm.

The photo resist mask is then removed together with the soft magnetic thin film formed thereon. As shown in FIGS. 26 and 27, this process forms the soft magnetic thin film 39 to the shape of the upper shield thin film 7 in each of many MR heads 1 which are finally produced. According to this shape, the width W2 is larger than the width W3 of the MR element 5 in the final MR head 1 and is smaller than the contact width W 4.

For the soft magnetic thin film 39 (finally the upper shield thin film 7), it is possible to use a material other than the above-mentioned amorphous lamination film if not affecting other films constituting the MR element 5 and the like. A method of forming the soft magnetic thin film 39 is not limited to the above-mentioned sputtering. It is also allowed to use other methods such as vaporization.

Figure 28:
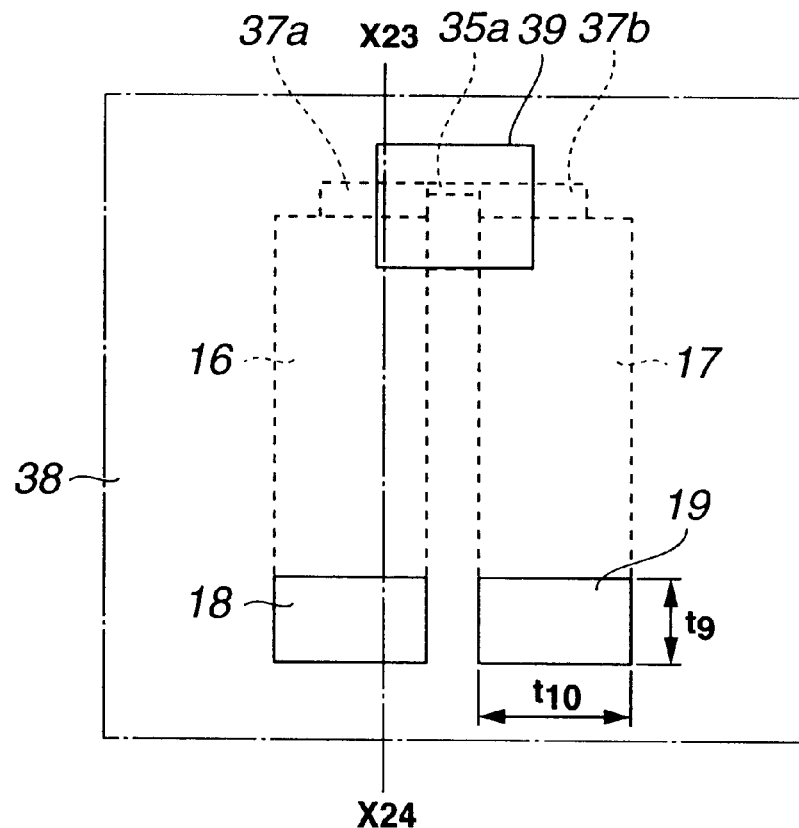
FIG. 28 is a top view showing that an external connection terminal is formed at a conductor end, explaining a manufacturing process for the MR head.
Figure 29:
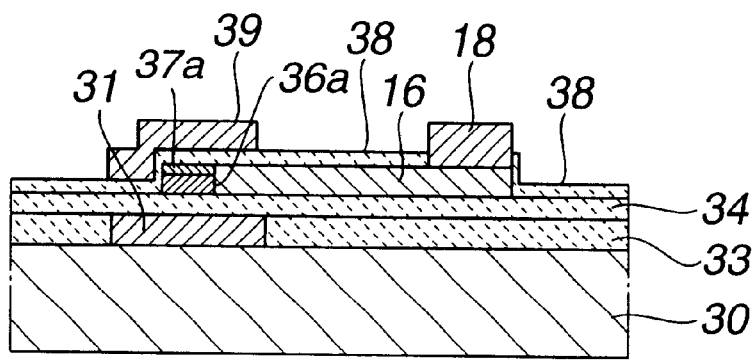
FIG. 29 is a cross-sectional view taken in the line X23–X24 of FIG. 28, explaining a manufacturing process for the MR head.

Then, as shown in FIGS. 28 and 29, a photolithography process is used to form the external connection terminals 18 and 19 on ends of the conductors 16 and 17.

Figure 30:
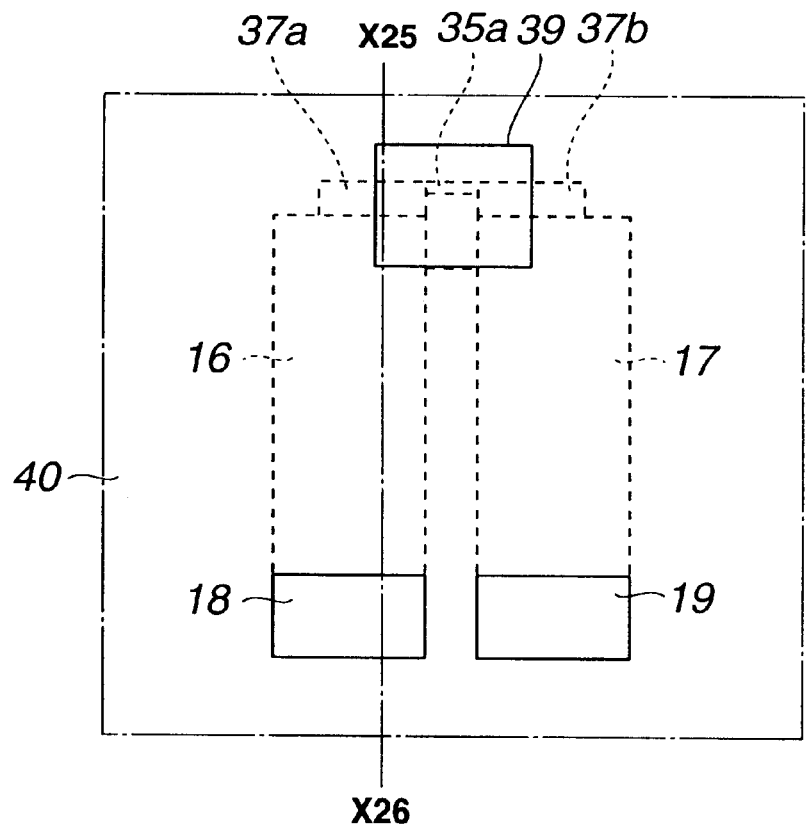
FIG. 30 is a top view showing that a flattening film is formed, explaining a manufacturing process for the MR head.
Figure 31:
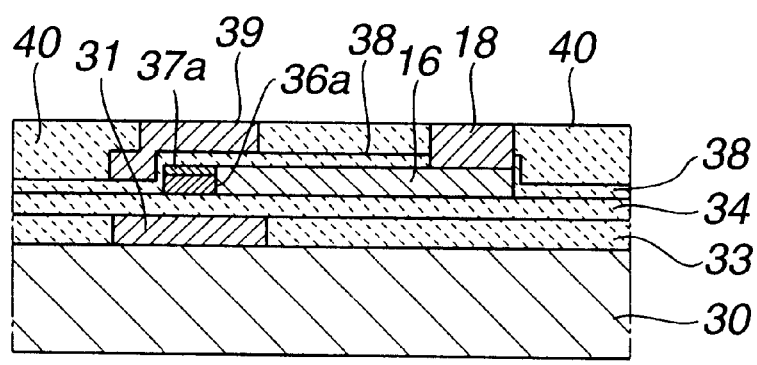
FIG. 31 is a cross-sectional view taken in the line X25–X26 of FIG. 30, explaining a manufacturing process for the MR head.

Specifically, for example, the photo resist is used to form a mask having openings on the ends of the conductors 16 and 17 where the external connection terminals 18 and 19 are to be formed. Then, the etching is performed to remove exposed portions of the nonmagnetic nonconductive film 38 from the openings. These portions correspond to locations where the external connection terminals 18 and 19 are to be formed. This etching process exposes the ends of the above-mentioned conductors 16 and 17. With the photo resist mask unremoved, a conducting layer is formed thereon. The conducting layer is formed by performing electroplating using a copper sulfate solution so that a Cu film becomes as thick as approximately 6 μm. A method of forming the conducting layer is not limited to electroplating. It is also allowed to use other methods if not affecting other films. The photo resist mask is then removed together with the conducting layer formed thereon. As shown in FIGS. 30 and 31, the external connection terminals 18 and 19 are formed on the ends of the conductors 16 and 17.

For example, the external connection terminals 18 and 19 each have a length t9 of approximately 50 μm. A width t10 of these terminals is same as the width t7 of the conductors 16 and 17 and is set to, say, approximately 80 μm.

As shown in FIGS. 30 and 31, a flattening film 40 of $Al_2O_3$ and the like is formed on the entire surface for isolating the entire MR head 1 and flattening its surface. The flattening film 40 is polished until a surface of a pair of external connection terminals 18 and 19 is exposed. During this polishing process, rough polishing is first applied, say, through the use of diamond abrasive grains with a grain diameter of approximately 2 μm until a surface of the external connection terminals 18 and 19 each is exposed. Then, buffing through the use of silicon abrasive grain is applied to mirror-finish the surface. Any nonmagnetic nonconductive material can be used for the flattening film 40. Considering environmental resistance, wear-resistant properties, and the like, however, $Al_2O_3$ is an optimal material. A method of forming the flattening film 40 is not limited to the above-mentioned sputtering. It is also allowed to use other methods such as vaporization.

After completion of these processes, there are formed many head devices finally functioning as MR heads 1 on the first substrate 30.

Figure 32:
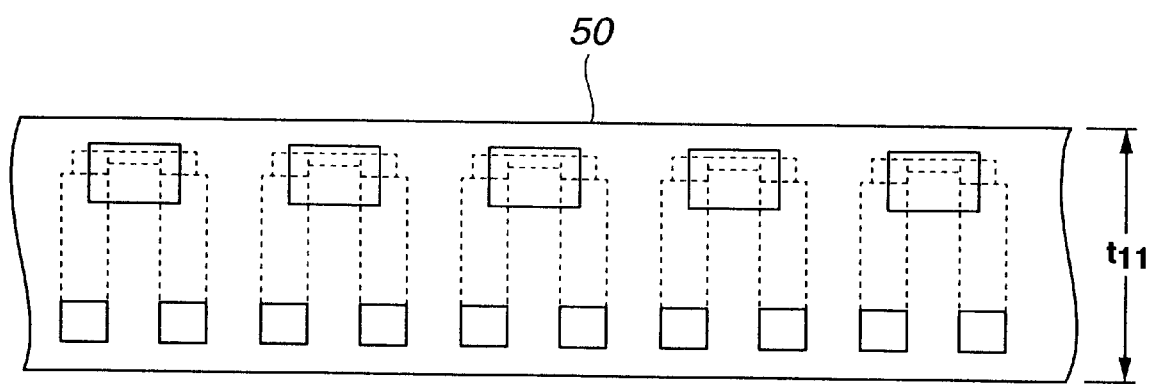
FIG. 32 is a top view showing a magnetic head block comprising a first substrate which is divided into strips for many laterally formed head devices, explaining a manufacturing process for the MR head.

The first substrate 30 where many head devices are formed is divided into strips each of which constitutes a magnetic head block 50 as shown in FIG. 32. Head devices are laterally placed on the magnetic head block 50. Considering productivity, it is desirable to laterally place as many head devices as possible. FIG. 32 shows the magnetic head block 50 which contains five head devices placed laterally. Actually, it is allowed to have more head devices on the magnetic head block 50. In this example, the magnetic head block 50 has a height t11 of approximately 2 mm.

Figure 33:
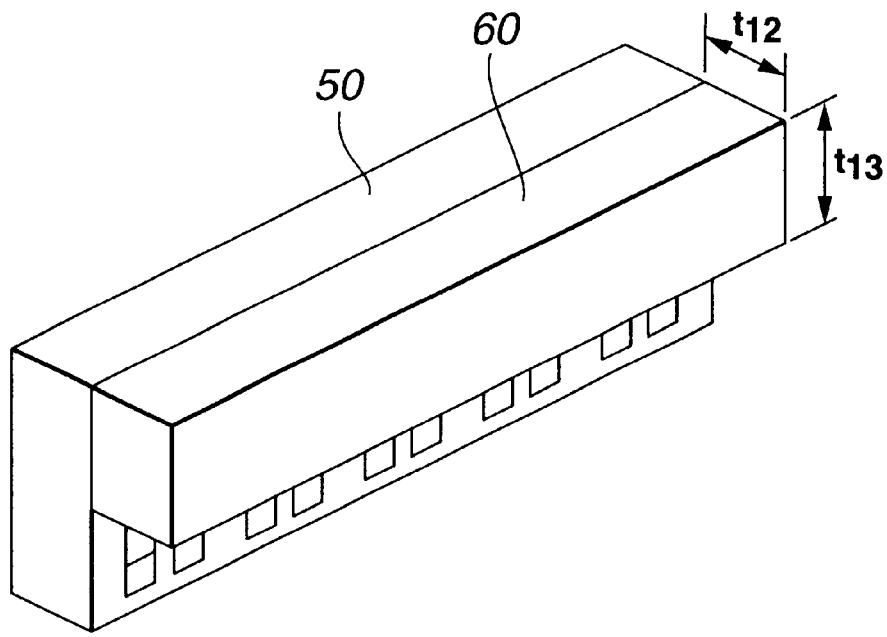
FIG. 33 is a perspective view showing that a second substrate is joined to the magnetic head block, explaining a manufacturing process for the MR head.

As shown in FIG. 33, a second substrate 60 with a thickness t12 of, say, approximately 1.7 mm is bonded to the magnetic head block 50 and is integrally joined with each other. The second substrate 60 finally functions as the second substrate 8 of the MR head 1. An adhesive material such as resin is used for bonding the second substrate 60. At this time, a second substrate 60's height t13 is made smaller than the magnetic head block 50's height t11 to outwardly expose the external connection terminals 16 and 17. This structure allows the external connection terminals 16 and 17 to be connected from the outside. A hard nonmagnetic material such as alumina-titanium carbide (Al—TiC) is used for the second substrate 60.

Figure 34:
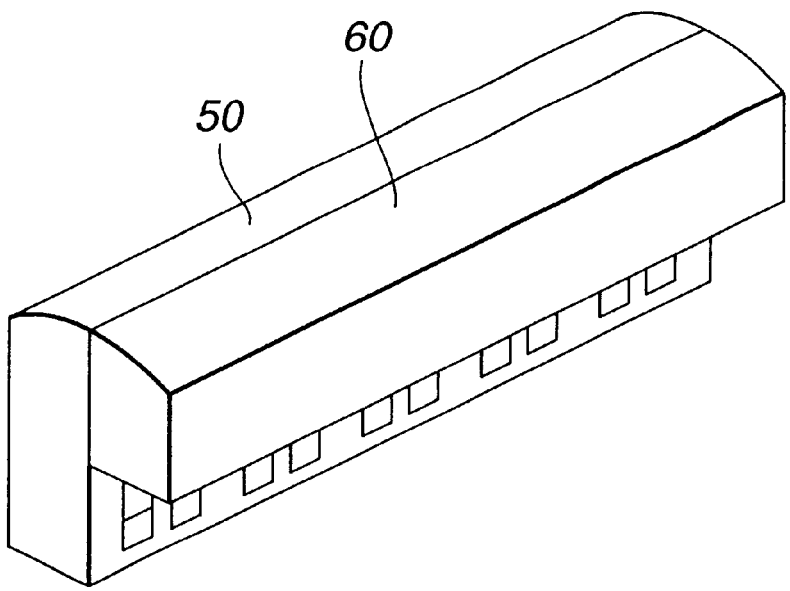
FIG. 34 is a perspective view showing that cylindrical polishing is applied to a tape sliding surface of the magnetic head block to which the second substrate is joined, explaining a manufacturing process for the MR head.

Then, cylindrical polishing is applied to a surface (finally the tape sliding surface 11 of the MR head 1) for curving it. Specifically, cylindrical polishing is applied until the MR element 5's front end is exposed from the tape sliding surface 11 and the MR element 5's depth reaches a specified value. As shown in FIG. 34, the cylindrical polishing curves a surface finally functioning as the tape sliding surface 1 of the MR head 1. There is no specification on a curved shape formed by this cylindrical polishing for the surface corresponding to the tape sliding surface 11 . An optimal shape can be selected according to a tape tension and the like.

Figure 35:
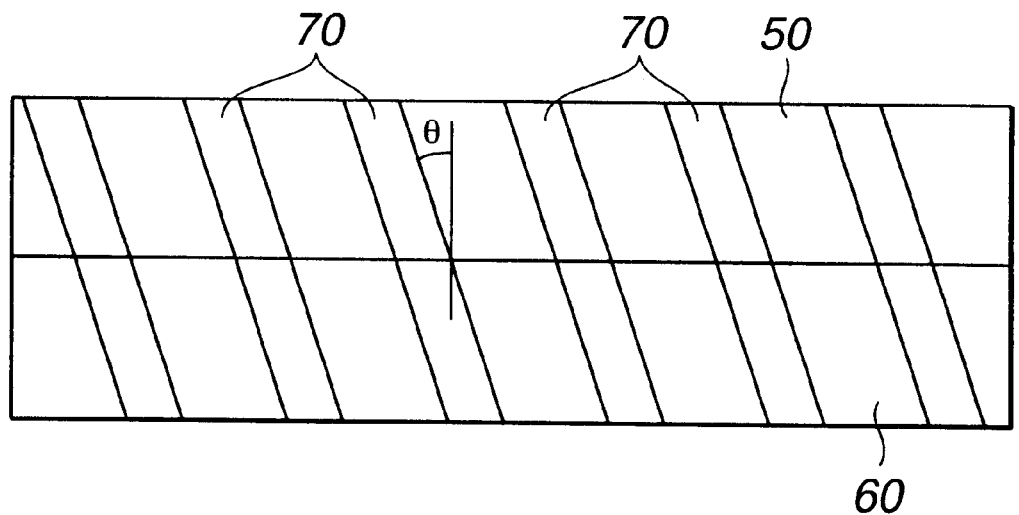
FIG. 35 is a top view showing that a plurality of grooves is formed on tape sliding surface where cylindrical polishing is applied as depicted in FIG. 34, explaining a manufacturing process for the MR head.

As shown in FIG. 35, a grinding process using a grind stone is applied to the curved surface formed by the cylindrical polishing. This process forms a plurality of grooves 70 which function as grooves 9 and 10 for restricting a contact width of the MR head 1. Each of these grooves 70 is located between adjacent head devices. Each groove 70 is formed so that it slants at a specified azimuth angle θ with reference to a direction orthogonal to a joint surface between the magnetic head block 50 and the second substrate 60. On a surface where a plurality of grooves 70 is formed, a region between adjacent grooves 70 finally becomes the tape sliding surface 11 of the MR head 1. A width of this region corresponds to the contact width for a magnetic tape. By setting the groove 70's width to an optimal value, it is possible to provide a desired contact width of the final MR head 1.

Figure 36:
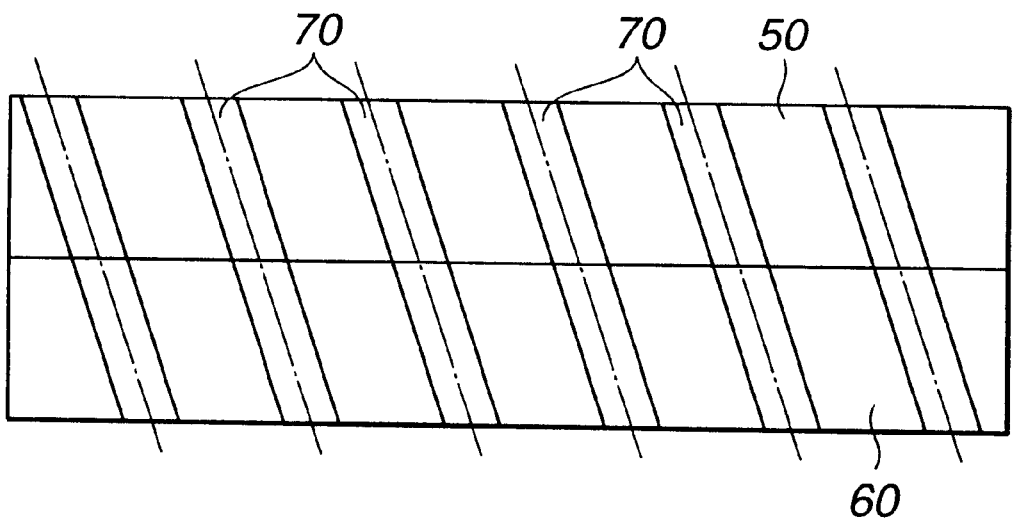
FIG. 36 is a top view showing how the magnetic head block joined with the second substrate is divided into each MR head, explaining a manufacturing process for the MR head.

Finally, as shown in FIG. 36, the magnetic head block 50 joined with the second substrate 60 is cut at a center line (alternate long and short dash line in FIG. 36) of the groove 70 to form the separate MR heads 1. Specifically, a joined unit of the magnetic head block 50 and the second substrate 60 is cut so that each MR head 1 is formed to be, say, approximately 0.8 mm long in the magnetic tape running direction, approximately 300 μm wide, and approximately 2 mm high, for example. This produces many MR heads 1 as shown in FIG. 1.

The thus manufactured MR head 1 is mounted on a head base. The external connection terminals 18 and 19 are electrically connected to terminals on the head base. The MR head 1, mounted on the head base, is further mounted on the rotary drum 22 and is used as a reproducing magnetic head for the rotary magnetic head apparatus 20.

What is claimed is:

1. A rotary magnetic head apparatus comprising:

an apparatus body having a stationary drum and a rotary drum rotatively mounted with reference to this stationary drum; and a reproducing magnetic head mounted at said rotary drum side of said apparatus body;

wherein said reproducing magnetic head is a magnetoresistive effect magnetic head in which an inter-shield gap is formed between joint surfaces for a pair of guard materials through the intermediation of a pair of magnetic shield thin films, and a magnetoresistive effect element is provided in this inter-shield gap, a groove is formed lengthwise at both width-direction ends of a sliding surface opposite to a magnetic recording medium, said grooves restrict a contact width of said reproducing magnetic head against said magnetic recording medium, and a width of said pair of magnetic shield thin films is larger than a width of said magnetoresistive effect element and is smaller than said contact width.

2. The rotary magnetic head apparatus described in claim 1, wherein said reproducing magnetic head has said pair of magnetic shield thin films with a width thereof set to 7/8 or less of said contact width.

* * * * *